US009582292B2

(12) United States Patent
Srivastava et al.

(10) Patent No.: US 9,582,292 B2
(45) Date of Patent: Feb. 28, 2017

(54) MERGED TREE-VIEW UI OBJECTS

(75) Inventors: Ankur Srivastava, Hyderabad (IN);
Neeraja Reddy, Hyderabad (IN);
Moshe Vainer, Redmond, WA (US)

(73) Assignee: MICROSOFT TECHNOLOGY LICENSING, LLC., Redmond, WA (US)

( * ) Notice: Subject to any disclaimer, the term of this patent is extended or adjusted under 35 U.S.C. 154(b) by 1145 days.

(21) Appl. No.: 12/247,022

(22) Filed: Oct. 7, 2008

(65) Prior Publication Data

US 2010/0088651 A1 Apr. 8, 2010

(51) Int. Cl.
*G06F 3/033* (2013.01)
*G06F 9/44* (2006.01)

(52) U.S. Cl.
CPC ................. *G06F 9/4443* (2013.01)

(58) Field of Classification Search
CPC ....................................................... G06F 3/00
USPC ................................................. 715/854, 853
See application file for complete search history.

(56) References Cited

U.S. PATENT DOCUMENTS

| | | | |
|---|---|---|---|
| 5,237,654 A * | 8/1993 | Shackelford et al. | 715/804 |
| 5,781,720 A | 7/1998 | Parker et al. | |
| 5,802,334 A * | 9/1998 | Nickolas et al. | 715/854 |
| 5,812,135 A * | 9/1998 | Kotchey | 715/853 |
| 6,078,327 A | 6/2000 | Liman et al. | |
| 6,266,681 B1 | 7/2001 | Guthrie | |
| 6,408,403 B1 | 6/2002 | Rodrigues et al. | |
| 6,424,361 B1 * | 7/2002 | Chapuis | 715/854 |
| 6,496,208 B1 * | 12/2002 | Bernhardt et al. | 715/853 |
| 6,628,304 B2 * | 9/2003 | Mitchell et al. | 715/734 |
| 6,772,165 B2 | 8/2004 | O'Carroll | |
| 6,826,443 B2 | 11/2004 | Makinen | |

(Continued)

OTHER PUBLICATIONS

Notice of Allowance from related U.S. Appl. No. 12/055,325 dated Oct. 29, 2010.

(Continued)

*Primary Examiner* — Amy Ng
*Assistant Examiner* — Meseker Takele
(74) *Attorney, Agent, or Firm* — Kevin Sullivan; Kate Drakos; Micky Minhas (57) ABSTRACT

Merging user interface (UI) object trees comprising UI trees from different technologies (e.g., host and one or more guest technologies) can involve registering guest technologies with a technology adapter layer, for example, used to manage UI tree merging. Further, identifying whether a UI object can be switched from a first technology to a second technology can comprise using a host technology provider to identify if a UI object can be switched, when navigating down the UI tree. When navigating up the UI tree, information stored by the technology adapter layer can be used to identify if a UI object can be switched. Additionally, identifying the second technology can comprise having the technology adapter layer request technology switching capability information from registered technologies for the UI object when navigating down the UI tree. When navigating up the UI tree, information stored by the technology adapter layer can be used to identify the second technology. Also, converting the UI object from the first technology to the second technology in the UI tree can be performed using a COM-based conversion.

20 Claims, 8 Drawing Sheets

(56) References Cited

U.S. PATENT DOCUMENTS

| | | | |
|---|---|---|---|
| 6,857,124 B1 | 2/2005 | Doyle | |
| 6,868,414 B2 | 3/2005 | Khanna et al. | |
| 6,961,909 B2* | 11/2005 | Lord et al. | 715/853 |
| 7,117,216 B2* | 10/2006 | Chakraborty et al. | |
| 7,231,606 B2 | 6/2007 | Miller et al. | |
| 7,243,090 B2 | 7/2007 | Kinzhalin et al. | |
| 7,343,568 B2* | 3/2008 | Jiang et al. | 715/854 |
| 7,426,703 B2* | 9/2008 | Cheung et al. | 715/854 |
| 7,475,365 B2* | 1/2009 | Nan et al. | 715/854 |
| 7,539,951 B1* | 5/2009 | Molander et al. | 715/853 |
| 7,580,970 B2 | 8/2009 | Bank et al. | |
| 7,653,721 B1 | 1/2010 | Romanov et al. | |
| 7,669,147 B1* | 2/2010 | Molander et al. | 715/854 |
| 7,698,392 B2 | 4/2010 | Zapata et al. | |
| 7,725,840 B2* | 5/2010 | Cohen et al. | 715/854 |
| 7,770,110 B1* | 8/2010 | Mansell et al. | 715/249 |
| 8,107,468 B2* | 1/2012 | Yang et al. | 370/388 |
| 2002/0083188 A1 | 6/2002 | Hericy et al. | |
| 2002/0188613 A1* | 12/2002 | Chakraborty et al. | 707/100 |
| 2003/0043192 A1 | 3/2003 | Bouleau | |
| 2003/0070061 A1* | 4/2003 | Wong et al. | 712/220 |
| 2003/0184585 A1* | 10/2003 | Lin et al. | 345/763 |
| 2004/0098707 A1 | 5/2004 | Tang et al. | |
| 2004/0225965 A1 | 11/2004 | Garside et al. | |
| 2005/0022115 A1 | 1/2005 | Baumgartner et al. | |
| 2005/0102684 A1* | 5/2005 | McKeon | 719/328 |
| 2005/0246153 A1 | 11/2005 | Genkin et al. | |
| 2005/0278728 A1 | 12/2005 | Klementiev | |
| 2006/0064481 A1 | 3/2006 | Baron et al. | |
| 2006/0064486 A1 | 3/2006 | Baron et al. | |
| 2006/0095895 A1 | 5/2006 | K. | |
| 2006/0101392 A1 | 5/2006 | Isaza | |
| 2006/0184410 A1 | 8/2006 | Ramamurthy et al. | |
| 2006/0222160 A1 | 10/2006 | Bank et al. | |
| 2006/0276997 A1 | 12/2006 | Drees | |
| 2007/0011650 A1 | 1/2007 | Hage et al. | |
| 2007/0061625 A1 | 3/2007 | Acosta, Jr. et al. | |
| 2007/0074169 A1 | 3/2007 | Chess et al. | |
| 2007/0088668 A1 | 4/2007 | Larab et al. | |
| 2007/0130293 A1 | 6/2007 | Dong et al. | |
| 2007/0150556 A1 | 6/2007 | Fukuda et al. | |
| 2007/0174300 A1 | 7/2007 | Kim | |
| 2007/0174419 A1 | 7/2007 | O'Connell et al. | |
| 2007/0192181 A1 | 8/2007 | Asdourian | |
| 2007/0214239 A1 | 9/2007 | Mechkov et al. | |
| 2007/0240118 A1 | 10/2007 | Keren | |
| 2007/0294619 A1 | 12/2007 | Krishnaswamy et al. | |
| 2008/0010537 A1 | 1/2008 | Hayutin et al. | |
| 2008/0092057 A1 | 4/2008 | Monson et al. | |
| 2008/0310816 A1 | 12/2008 | Allen et al. | |
| 2009/0089404 A1 | 4/2009 | Guo | |
| 2009/0249300 A1 | 10/2009 | Vainer et al. | |
| 2010/0088651 A1 | 4/2010 | Srivastava et al. | |
| 2010/0125651 A1 | 5/2010 | Zapata et al. | |
| 2010/0251217 A1 | 9/2010 | Miller | |
| 2011/0145402 A1 | 6/2011 | Thagadurai et al. | |

OTHER PUBLICATIONS

U.S. Appl. No. 12/055,325, filed Mar. 26, 2008, Shankar et al.

U.S. Appl. No. 12/056,301, filed Mar. 27, 2008, Vainer et al.

Hadlock Kris, "How to Handle AJAX Responses", Feb. 10, 2006, pp. 1-2.

Levy et al. "Advancing Toward Test Automation Through Effective Manual Testing", Dated May 2005, pp. 1-12.

McCaffrey James, "AJAX Test Automation", http://msdm.microsoft.com/msdnmag/issues/07/02/TestRun/default.aspx.

McLaughlin Brett, "Mastering AJAX, Part 3: Advanced requests and responses in Ajax", Feb. 14, 2006, pp. 1-14.

Raghavan, "AJAX testing using QEngine", Oct. 15, 2007, pp. 1-4.

Rational Software, "IBM Rational Functional Tester", pp. 1-4.

Xiong et al., "Testing Ajax Applications with Selenium", Sep. 25, 2006, pp. 1-5.

"UI Automation and Microsoft Active Accessibility", Retrieved at <<http://msdn.microsoft.com/en-us/library/ms788733.aspx>>, May 7, 2008, p. 1.

"How to Use UI Automation Verify (UIA Verify)", Retrieved at <<http://www.google.co.in/url?sa=t&ct=res&cd=7&url= http%3A%2F%2Fwww.codeplex. com%2FProject%2FDownload%2FFileDownload. aspx%3FProjectName%3DUIAutomationVerify%26DownloadId% 3D29576&ei=WmQhSPr_B4v2wwGXzdnPAw&usg=AFQjCNE-Srz0Yvv3lraEoh0YFhPCELDl4w&sig2= FQzOMkaE7cgKEU2cKNq1Xg>>, Mar. 2008, pp. 20.

"User Interface Automation (UIA)—Working Draft", Retrieved at <<http://download.microsoft.com/download/5/e/1/5e168e97-91dd-4ca3-ac7e-2131aec8cd1b/Overview_UIA.doc>>, pp. 38.

Mishra, Umakant "Inventions on Tree Navigators Used in Graphical User Interface", Retrieved at <<http://papers.ssm.com/sol3/papers.cfm?abstract_id=949244#PaperDownload>>, pp. 7.

Supplemental Notice of Allowance cited in U.S. Appl. No. 12/055,325 dated Oct. 29, 2010, 15 pgs.

Amendment after Notice of Allowance cited in U.S. Appl. No. 12/055,325 dated Jan. 21, 2011, 11 pgs.

Amendment after Notice of Allowance cited in U.S. Appl. No. 12/056,301 dated Mar. 13, 2012, 11 pgs.

Non-Final Office Action cited in related U.S. Appl. No. 12/086,301 dated Jul. 24, 2011.

Reply to Non-Final Office Action cited in related U.S. Appl. No. 12/086,301 dated Oct. 27, 2011.

Notice of Allowance cited in related U.S. Appl. No. 12/086,301 daated Dec. 19, 2011.

"Composing a Framework to Automate Testing of Operational Web-Based Software", Steedevi Sampath, Valentin Mihaylov, Amie Souter and Lori Pollock, Proceedings of the 20th IEEE International Conference on Software Maintenance, 2004, 10 pgs.

\* cited by examiner

MERGED TREE-VIEW UI OBJECTS

BACKGROUND

In a computing environment, certain managed code application programming interfaces (APIs) can be used for exposing user interface (UI) elements (e.g., controls, objects). Exposing UI elements can be helpful for UI test automation and UI assistive technology (e.g., screen readers), enabling one to manipulate the UI elements by means other than standard inputs. A UI tester may wish to view and map the various objects that underlie the UI, for example, in order to write test scripts to interact with the UI. In a UI, differing framework properties may underlie pieces of the UI, for example, from differing technologies that comprise the UI's functionality.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

Currently technologies for exposing user interface (UI) elements can include UI Automation, which can expose pieces of the UI to client applications. However, different technologies in a UI can have different UI element trees, for example, window handles (e.g., HWND tree), Internet Explorer COM (e.g., IE DOM tree), and others. In this example, UI elements can be contained in a tree structure, with a desktop as a root element. One can navigate the UI tree to gather information about the UI and its elements, for example. Within a UI tree there can be a root element (e.g., RootElement) that can, for example, represent the current desktop and whose child elements can represent various application windows. Each child elements can further contain elements representing pieces of the UI, such as, menus, buttons, toolbars, and list boxes. Further, these elements can also contain elements such as list items.

A UI tree may not be a fixed structure and can contain thousands of elements. UI technology providers can support a UI tree by implementing navigation among items within a portion of the tree exposed by their technology. However, UI technology providers are not typically concerned with navigation from one UI technology control to another. Typically, different trees may have to be used for different technologies that expose UI elements. Therefore, exposing UI trees using different technologies and navigating between the controls from different UI technology providers can become cumbersome. It may be desirable to have a single tree-view of a UI that can incorporate a variety of UI element exposing technologies.

Techniques and systems are provided herein for providing a merged tree view of user interface (UI) objects in a windowless UI, where multiple technologies may be used to expose objects in a UI tree, utilizing a technology adapter layer. In one embodiment one can register guest technologies (e.g., technologies used in a host program) that may be used in the UI with the technology adapter layer (TAL), for example, which may allow the TAL to manage these guest technologies where appropriate. Further, in this embodiment, one may identify whether a UI object in a UI tree can be switched from a first technology to a second technology (e.g., from the host technology to a guest technology). When navigating down the UI tree, a host technology provider can identify if a UI object in a UI tree can be switched, for example, because during windowless tree-merging the host provider typically knows if switching may be done. When navigating up the UI tree, the identification can comprise using information stored by the TAL to identify if a UI object in a UI tree can be switched, for example, information pertaining to switched technologies stored in a TAL cache when navigating down the UI tree.

After identifying whether the UI object can be switched, one can identify the second technology to be used when switching the UI object in the UI tree. In this embodiment, when navigating down the UI tree, the TAL can request technology switching capability information from one or more registered guest technologies for the UI object, for example, asking the guest technologies if they can switch. When navigating up the UI tree, one can use information stored by the TAL (e.g., from navigating down the tree) to identify the second technology. After determining the second technology, one can convert the UI object from the first technology to the second technology in the UI tree using a COM-based conversion for the UI object.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

Figure 1:
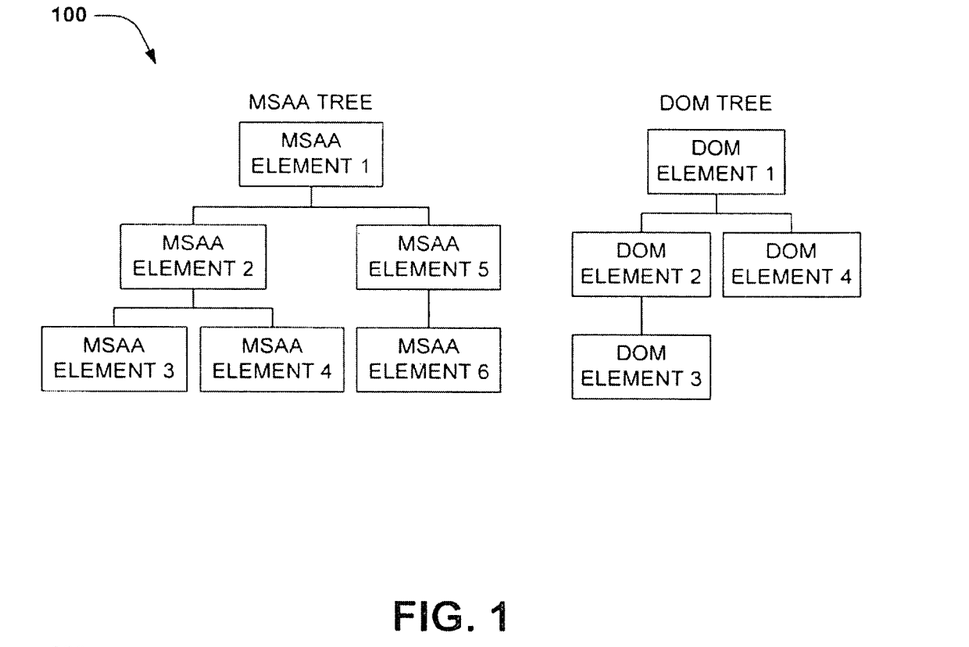
FIG. 1 is an illustration of exemplary user interface (UI) object trees displayed using different technologies.

FIG. 1 is an illustration of an exemplary embodiment 100 of user interface (UI) object trees. In this embodiment 100, a Microsoft Active Accessibility (MSAA) UI object tree comprises elements one through six and a Document Object Model (DOM) UI object tree comprises elements one through four. As an example, a UI may comprise elements that can be exposed using a variety of technologies. In this example, when the UI elements are exposed by the MSAA technology provider a user may see a different tree than when the UI elements are exposed by the DOM technology provider. However, in this example, even though the UI trees may comprise different views for differing technologies, some of the elements may the same between the two trees.

Figure 2:
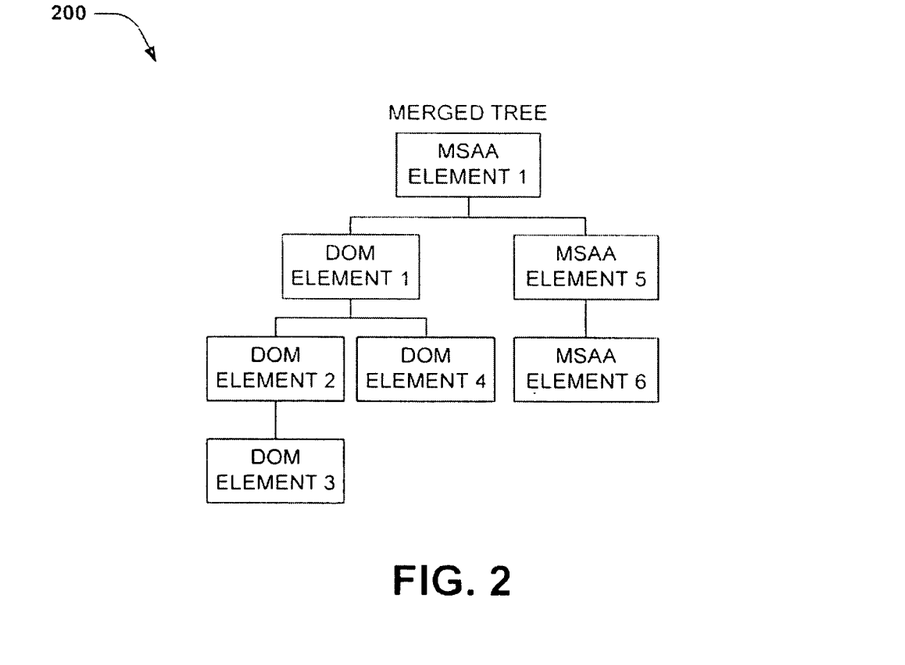
FIG. 2 is an illustration of an exemplary UI object tree comprising different technologies merged together.

In one embodiment, one may find a common UI object for both UI trees. As an example, MSAA element two may also be DOM element one, thereby providing a UI element common to both technology trees. In this embodiment, one may merge together both trees from a point of the common element. FIG. 2 is an illustration of an exemplary UI tree 200, "stitched" together at a point of a common UI element. In this example, where MSAA element two is DOM element one, the DOM tree is merged into the MSAA tree at the point of the MSAA element two, also replacing the MSAA element two and its child elements three and four. In this way, in this example, a user may be able to view the UI tree comprising both technologies.

In one aspect, in order to facilitate merging (e.g., stitching) of two UI trees from differing technologies, there may several issues for one to resolve. In this aspect, one may wish to identify a common element (e.g., MSAA element two and DOM element one), for example. For windowless user interfaces, such as browser DOM hosting of an ActiveX component or a Windows Presentation Foundation (WPF) application hosting an ActiveX component, identifying an element to merge (e.g., switch) can be different for respective technologies, thereby having no standard identification process.

Further, if a UI object switch is identified, one may wish to identify which other technology tree can be merged (e.g., switched or stitched into) with the UI tree. In a windowless environment, one may not use a window property to identify a technology to merge into the UI tree, thereby providing no standard way to identify the technology to merge. Additionally, when converting a UI object from one technology to another (e.g., merging two UI tree together), a windowless environment may not provide a standard way to perform conversion.

Figure 3:
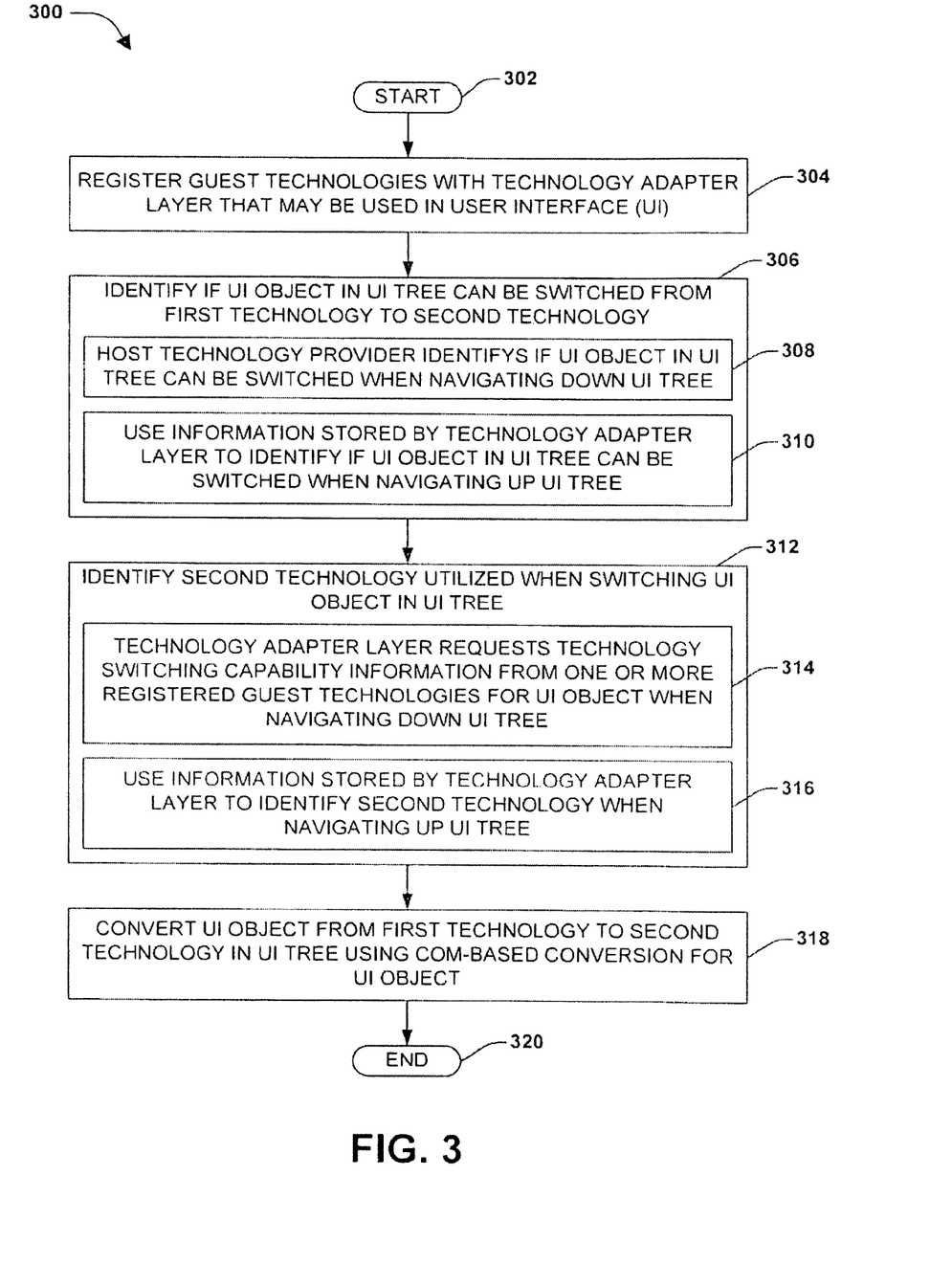
FIG. 3 is a flow chart diagram illustrating an exemplary method for providing a merged tree view of user interface (UI) objects in a windowless UI.

FIG. 3 is a flow diagram of an exemplary method 300 for providing a merged tree of user interface (UI) objects in a windowless UI, where multiple technologies may be use to expose objects in a UI tree. The exemplary method 300 begins at 302 and involves registering guest technologies that may be used in the UI with a technology adapter layer, at 304. As an example, in one embodiment, a technology adapter layer (TAL) may be utilized for managing multiple technology providers in a UI. In this embodiment, the TAL can be used to register guest technologies, for example, in order to facilitate tree merging. Additionally, in this example, the TAL may be used to merge UI trees together.

At 306, in the exemplary method 300, one can identify whether a UI object in a UI tree can be switched from a first technology to a second technology. For example, when moving through a tree, one can determine whether switching can be done at respective nodes in the tree (e.g., at MSAA element 2, it can be switched to DOM element 1, as described above). When navigating down a UI tree, a host technology provider can identify if the UI object in the UI tree can be switched, at 308. As an example, respective technology providers typically work over a technology and, therefore, are usually a wrapper over a native object of the technology it supports (e.g., native object for technology provider IEDOM can be IHTMLElement). In this example, a host provider of the UI object reached in the tree knows that a switch can be made to another technology (e.g., using an object tag in Internet Explorer (IE)). In this way, in one embodiment, the TAL can ask the technology provider for the UI object of their hosted technologies if switching can be done, for example.

At 308, in the exemplary method 300, when navigating up the UI tree, one can identify if the UI object can be switched in the UI tree by using information stored by the TAL. As an example, if a switch was done at a UI object when navigating down the UI tree, when navigating back up the UI tree, the same UI object can be a container object with information stored by a TAL cache. In this example, if the UI object is a container object, then switching can be performed, as a windowless technology switch was performed for some ancestor of the UI object. In one embodiment, when reaching a UI object that is a container object, one can determine if a boundary of the current technology has been reached (e.g., the upper node of the current tree) by attempting to "get the parent" of the UI object. In this embodiment, if the parent is null or the container can be converted to a parent of the current technology, then a boundary has been reached.

At 312, in the exemplary method 300, a second technology is identified that can be utilized to switch the UI object to in the UI tree. As an example, while a host technology provider may know that a switch can be made for the UI object of its supported technology, the host provider may not know which other provider to call for conversion. At 314, when navigating down the UI tree, the TAL can send a request to guest technologies, which have registered with the TAL as described above, asking for their switching capabilities with respect to the UI object.

As an example, in one embodiment, when technology providers register with the TAL for windowless switching they can implement a function that gets a UI object from a container if present (e.g., UIObject TechnologyProvider.GetObjectFromContainer (UIObject objectToSwitchTreeAt)). In this embodiment, the request function asks the registered technology provider to return the UI Object from their technology found in a container for the UI object. If a UI object is returned when the TAL evaluates this function, then the TAL can assume that the UI object is able to switch to that registered technology, for example. In this embodiment, if none of the registered technologies return a UI Object, the TAL won't perform the switch.

In another embodiment, if more than one registered technology provider returns a UI object from the request function, a technology switch in the UI tree can be selected based on a pre-determined priority basis. For example, list of registered technology providers can be prioritized based on a user's preferences, or some preset default measure based on a potential use for the exposed UI elements. The TAL can use the prioritized list to determine which of the registered technology providers to use for the switch, if more than one returns a UI object from the request function.

At 316, of the exemplary method 300, when navigating up the UI tree to merge UI trees, the second technology can be identified using information stored by the TAL. In one embodiment, when navigating down the UI tree, the TAL can store an identity of the technology provider used to make a switch in a container UI object, for example, in a cache. In this embodiment, for example, when navigating up the UI tree and this container UI object is reached, the information stored by the TAL in the cache can be used to determine which registered technology can be used to switch to (e.g., merge UI trees).

At 318, the UI object can be converted from the first technology (e.g., the host technology) to the second technology (e.g., an identified registered technology) in the UI tree using a COM-based conversion for the UI object. In one embodiment, COM interfaces may be used for two different technologies to communicate when hosting guest technologies. In this embodiment, a COM-based conversion can work for a majority of circumstances when switching UI objects between technologies (e.g., merging UI trees from different technologies together). As an example, the COM-based conversion can be a default for native objects (e.g., a native object for IE is IHTMLElement). In this example, a technology provider (e.g., MSAA) can query an IUnkown object for IAccessible interface and construct the technology provider's UI Object (e.g., a MSAA UIObject).

Figure 4:
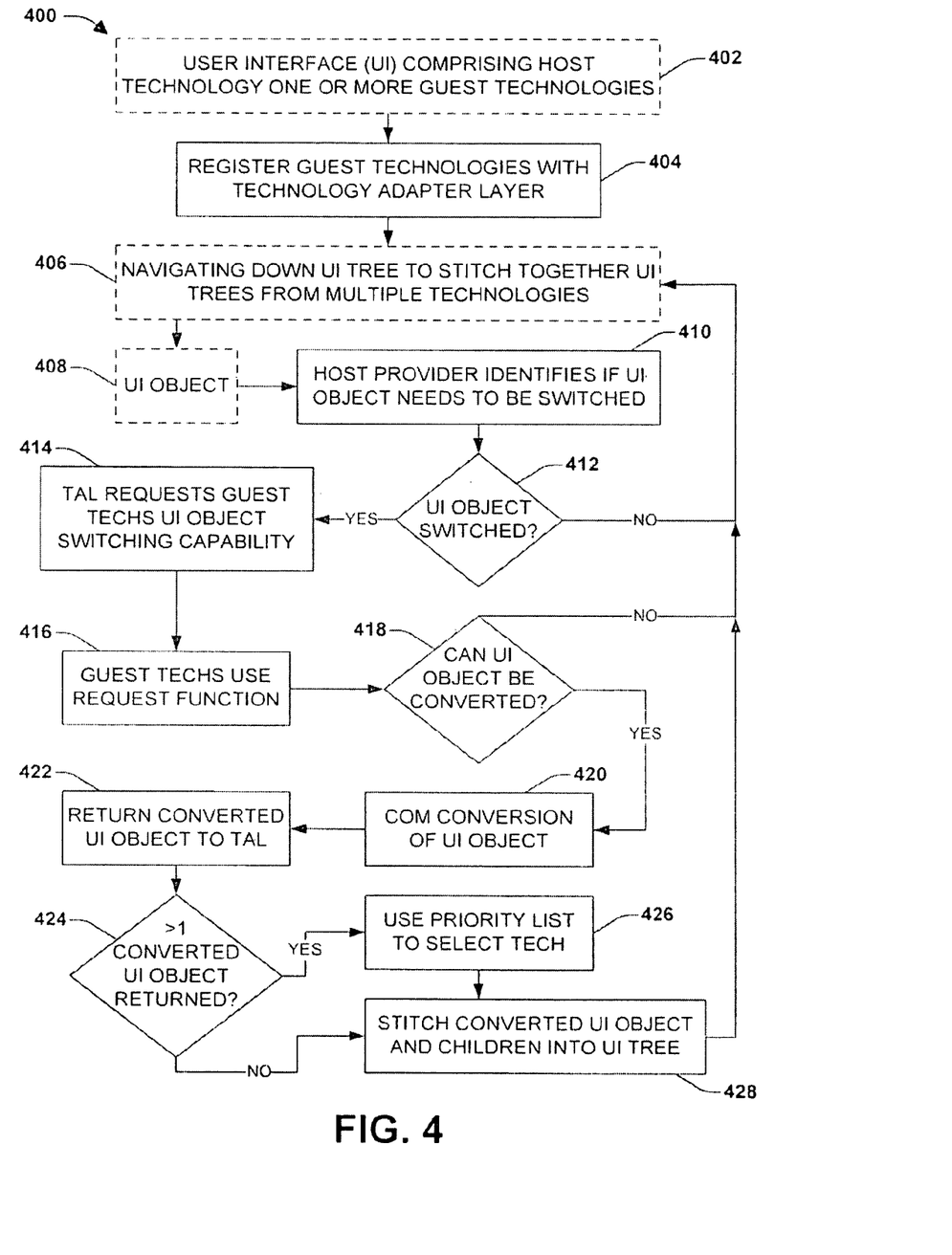
FIG. 4 is a flow chart diagram illustrating an exemplary embodiment of merging UI objects when navigating down a UI tree.

In one aspect, for example, if a tester wished to write test code for a UI, they may wish to expose UI elements in order to identify objects and actions that may be utilized during testing. In this example, exposing the UI elements (e.g., using UI Automation), may yield a tree of UI objects rooted at a desktop, comprising application windows, elements and controls for the UI. However, if the UI comprises guest technologies, exposing the UI elements in the host technology may not yield information from the guest technologies, or the tester may have to switch between UI trees for respective technologies, for example. Combining multiple technologies may facilitate a tester's ability to generate test code for the UI. FIG. 4 illustrates a flow diagram of one embodiment 400 of the exemplary method 300, described in FIG. 3, for merging UI trees from different technologies while navigating down the UI tree in a windowless environment.

At 402, a user interface (UI) comprises a host technology and one or more guest technologies (e.g., a windowless UI such as Internet Explorer hosting a component object model such as ActiveX). At 404, the guest technologies are registered with a technology adapter layer (TAL). For example, registering the guest technologies with the TAL can allow the TAL to manage merging of UI trees from the various technologies, reviewing function requests for potential technology switches between different technologies, and store (e.g., cache) information pertaining to UI object switching between technologies.

When navigating down the UI tree, to merge together UI tree from multiple technologies, at 406, and a UI object is encountered, at 408, a host provider can identify if the UI object can be switched from the host technology to another technology (e.g., merging the two technologies' UI trees together at this point), at 410. In this embodiment, because windowless tree-merging is being undertaken, the host provider typically knows when a switch can be made to a tree from another technology. Therefore, for example, for a parent UI object in the UI tree, the TAL can ask the technology provider is switching can be done for the UI object. In this example, if a response to the request is "true" then switching (e.g., the trees can be merged for respective technologies) can be performed on the UI object (e.g., for an object tag in IE).

At 412, if switching is cannot be performed at the UI object (e.g., a "false" is returned from the request), the exemplary embodiment 400 of the method returns to navigating down the UI tree, at 406. However, if the UI object can be switched, the TAL can ask the guest technologies for their switching capabilities pertaining to the UI object, at 414. For example, technology providers that registered with the TAL can implement a "get object" request function from the TAL. In this example, the function can request that a UI object be returned, supported by the registered technology provider, which can be used to switch for the UI object in the UI tree at that position.

At 416, the registered guest technologies apply the request function, and return a response to the TAL. In one embodiment, if the response is not null, it can comprise a UI object that can be merged into the UI tree (e.g., UI objects switched) at the UI object position after conversion. At 418, if a null response, for example, is returned by the respective registered technology providers, a switch is not made and navigation down the tree is continued at 406. However, if a UI object switch can be made, in one embodiment, a COM-based conversion is performed, at 420, from the first technology to the second technology. The converted UI object comprising the second technology is returned to the TAL at 422, for example, as a response to the request function performed at 416.

If more than one converted UI object is returned to the TAL, for example, if more than one technology can perform a switch at the UI object, at 424, a priority list can be used to determine which of the returned UI objects will be used, at 426. In one embodiment, a request function for returning a converted UI object from registered guest technologies can return multiple UI objects. In this embodiment, a predetermined priority list can be used to select which technology to use at this point. As an example, user preferences can be preset, or a heuristic determination may be used.

If only one converted UI object is returned, or a selection from multiple UI objects has been made, at 428, the converted UI object is merged into the UI tree (stitched onto the tree). In one embodiment, if the merged UI object comprises children, the children can also be merged into the UI tree (e.g., see FIGS. 1 and 2). In another embodiment, the merged UI object can be checked to see if needs to be switched at 410. After merging the registered technology UI object into the UI tree, navigation down the tree continues at 406, for example, until the final node of the tree is reached.

Figure 5:
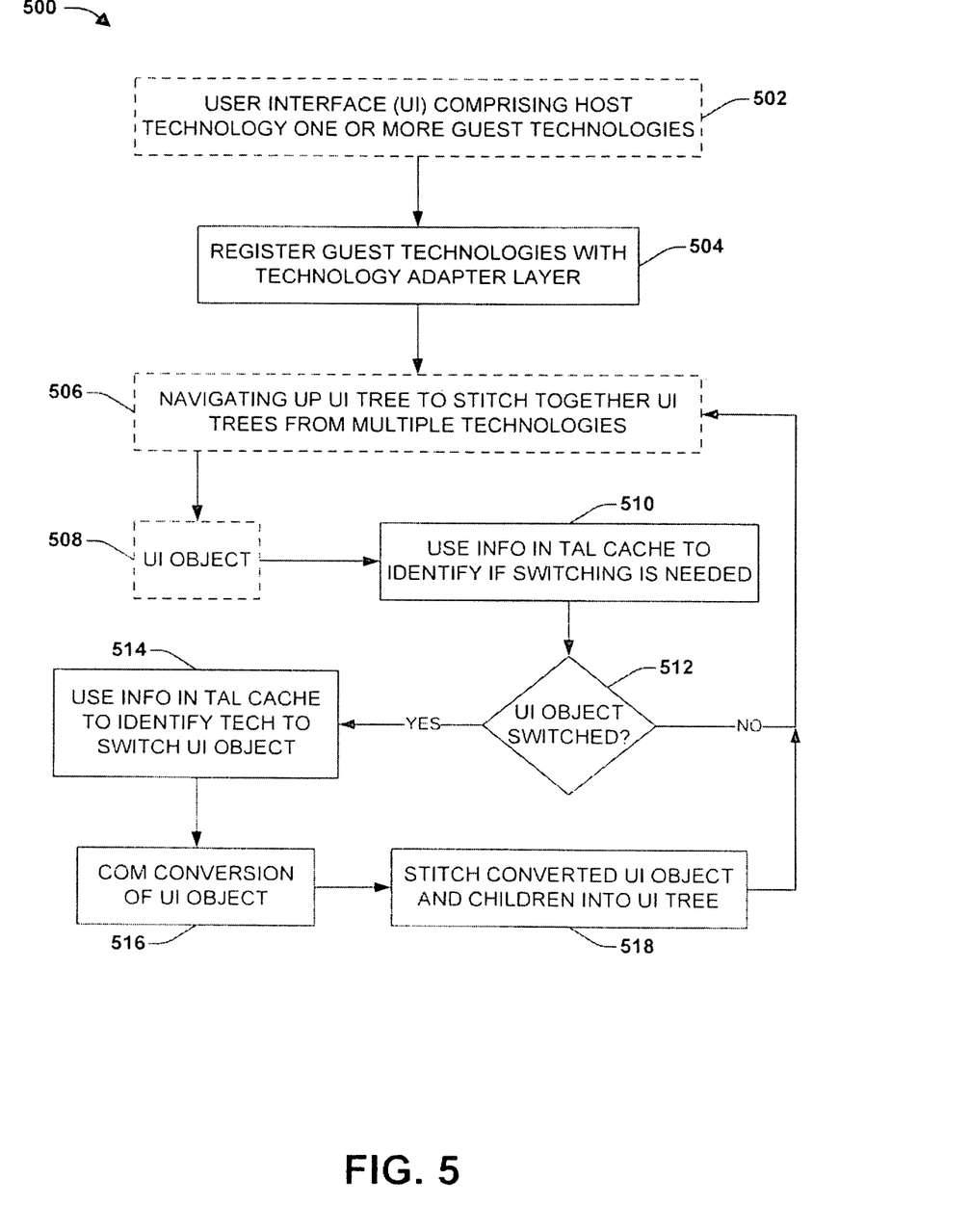
FIG. 5 is a flow chart diagram illustrating an exemplary embodiment of merging UI objects when navigating up a UI tree.

FIG. 5 illustrates a flow diagram of one embodiment 400 of the exemplary method 300, described in FIG. 3, for merging UI trees from different technologies while navigating up the UI tree in a windowless environment. At 502, a user interface (UI) comprises a host technology and one or more guest technologies, as described above. At 504, the guest technologies are registered with a technology adapter layer (TAL), allowing the TAL to manage merging of UI trees from the various technologies. However, in one embodiment, the guest technologies may have been previously registered.

When navigating up the UI tree, to merge together UI tree from multiple technologies, at 506, and a UI object is encountered, at 508, information from the TAL cache can be used to identify if technology switching can be done, at 510. In one embodiment, as described above, when navigating down the UI tree, the TAL can store switching information in container UI objects in a cache. In this embodiment, if the UI object that is encountered at 508 is a container object, it is likely that technology switching has occurred. If switching has not occurred (e.g., the UI object is not a container object), at 512, navigation up the tree continues at 506. However, if technology switching can take place at the UI object, at 512, information from the TAL cache (e.g., information in the UI container object) can be used to identify which registered technology to merge into the UI tree, at 514.

In one embodiment, a COM-based conversion of the UI object from the first technology to the second technology (e.g., identified by the TAL cache), can be performed at 516. In another embodiment, a COM-based conversion may not be supported, and respective technology providers can register corresponding "convert" function with the TAL. In this embodiment, respective "convert" functions can take a UI object and return a UI object of a supported type for the corresponding technology. At 518, the converted UI object can be merged (e.g., stitched) into the UI tree, including any children for the converted UI object. Navigation up the UI tree can continue, at 506.

Figure 6:
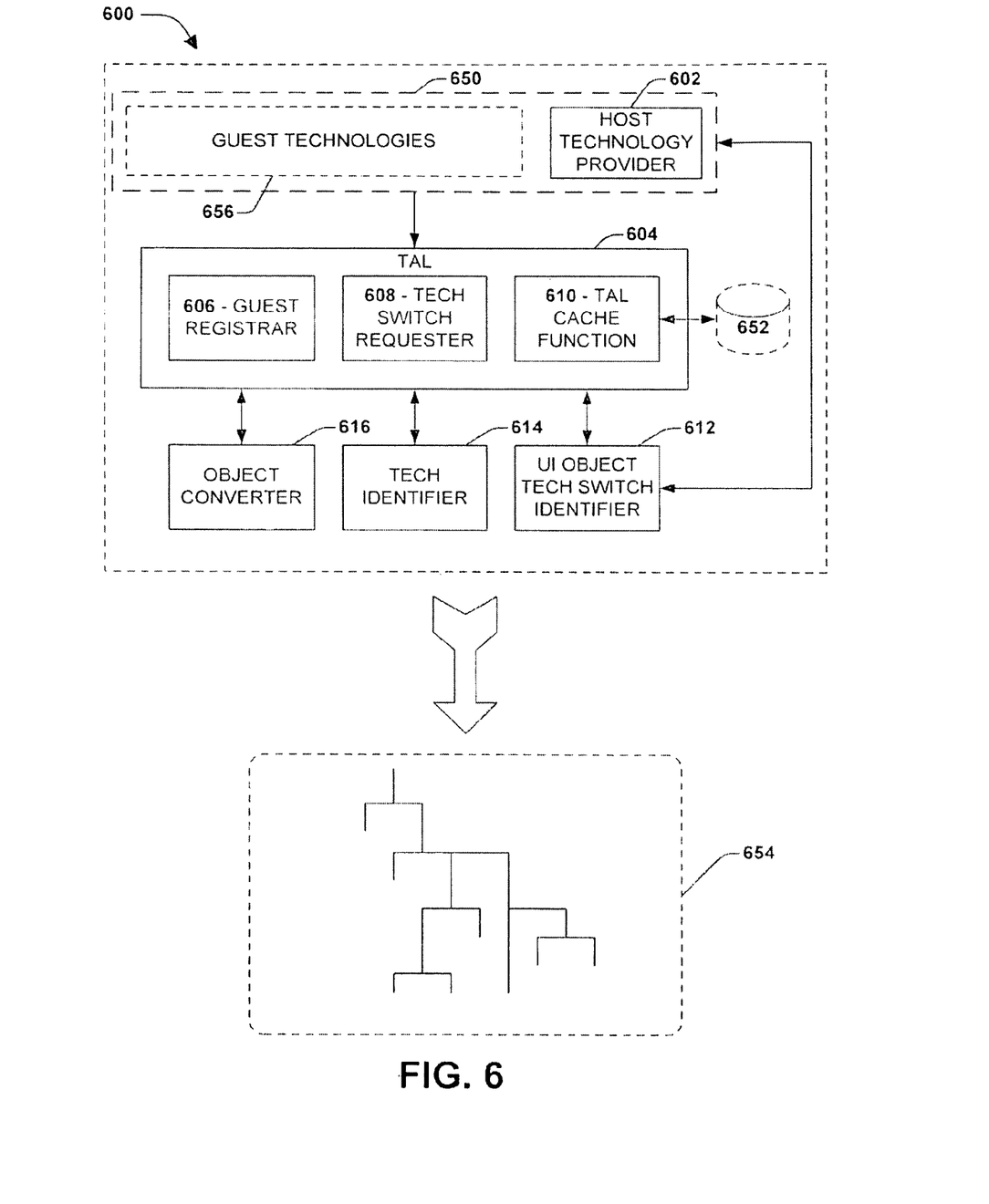
FIG. 6 is a component block diagram illustrating an exemplary system for providing a merged tree of UI objects in a windowless UI.

A system may be devised for providing a merged tree of user interface (UI) objects in a windowless UI, where multiple technologies may be use to expose objects in a UI tree. FIG. 6 is a component block diagram illustrating an exemplary system 600 for providing a merged tree of UI objects in a windowless UI. In this embodiment, the exemplary system 600 comprises a UI host technology provider 602, which can be configured to identify if a UI object can be switched from a first technology to a second technology when navigating down the UI tree 654. As an example, the host technology provider 602 can be queried to determine if switching to a second technology in the UI tree (e.g., merging a second technology's UI tree into a first technology's UI tree) can be performed for a specified UI object. In this example, in a windowless UI environment, the host technology provider 602 (e.g., Internet Explorer (IE) as a host running an ActiveX as a guest) knows when to switch the UI tree, therefore, a query to the host technology provider 602 on whether switching can be done may return a "true" or "false."

The exemplary system 600 further comprises a technology adapter layer 604 (TAL), which, in one embodiment, may be used to manage registered UI technologies 650 and the UI tree merging. The TAL 604 comprises a guest technology registration function 606, which can be configured to register guest technologies for the UI. As an example, a host technology may be running (or allowing to run) one or more guest technologies 656 in the UI. In this example, the guest technology registration function 606 can be used to register the guest technologies for the TAL 604, in order to facilitate UI tree merging.

The TAL 604, in the exemplary system 600, further comprises a TAL cache function 610, which can be configured to store UI tree information when navigating down a UI tree. In one embodiment, the UI tree information can comprise: information identifying technology switches in the UI tree; information identifying a first technology for a UI object prior to switching; information identifying a second technology for the UI object after the switching; and information identifying children of the UI object. In this embodiment, the information gathered while navigating down the UI tree can be stored in a TAL cache 652, represented by UI container objects in the UI tree 654. As an example, information gathered for UI objects by the TAL 604, while navigating down the UI tree 654, can be stored in corresponding UI object containers, thereby allowing the information to be retrieved when navigating up the UI tree.

The TAL 604, in the exemplary system 600, further comprises a technology switching capability request function 608, which can be configured to request technology switching capability information from respective registered guest technologies 656 for the UI object when navigating down the UI tree 654. In one embodiment, when guest technology providers register with the TAL 604 for windowless switching can implement the technology switching capability request function 608. In this embodiment, for example, when activated by the TAL while navigating down the tree, the request function 608 asks respective guest technologies 656 to return a UI object, supported by the guest technology 656, to switch with the host technology at a UI object in the UI tree 654. In this way, in this example, the TAL 604 may identify if switching can occur, and which guest technologies 656 can be used for the switch.

Figure 7:
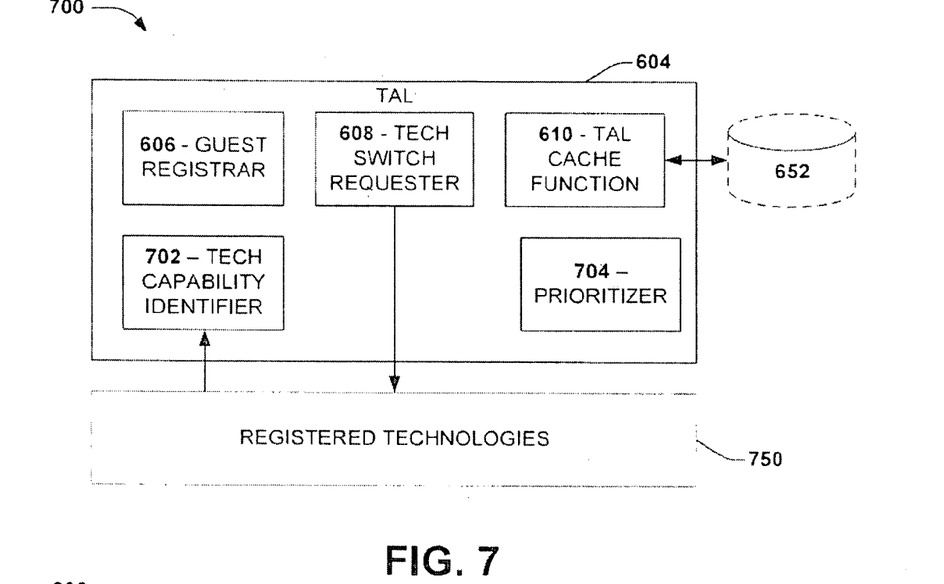
FIG. 7 is a component block diagram illustrating an exemplary technology capability identification function.

In one embodiment, the TAL 604 can further comprise a technology capability identification function 702, as seen in the exemplary embodiment 700 of the TAL 604 in FIG. 7. In this example 700, the technology capability identification function 702 can be configured to identify whether a registered technology 750 returns a desired response to the technology switching capability request by the technology switching capability request function 702. In this embodiment, for example, a desired response may be a UI object supported by the registered technology 750, which can be merged into the UI tree at a specified UI object.

Further, in this exemplary embodiment 700, the TAL 604 can comprise a priority function 704, which can be configured to select a UI object technology switch based on a pre-determined priority. As an example, if more than one desired response is returned to the technology switching capability request by the technology switching capability request function 702, the priority function 704 can determine which responding registered technology 750 to use for merging into the UI tree. In one embodiment, priority can be determined by a pre-determined user preference. It will be appreciated that, those skilled in the art may devise other priority determinations, and that the techniques and systems described herein are not limited to a particular priority determination.

Turning back to FIG. 6, the exemplary system 600 further comprises a UI object technology switching identifier 614, which can be configured to use information stored by the TAL cache function 610 to identify whether a UI object can be switched from a first technology to a second technology when navigating up the UI tree. As described above, when navigating down a UI tree, the TAL 604 can store UI tree switching information, for example, as UI object containers. In one embodiment, the UI object technology switching identifier 614 can use the information from a UI container object to identify whether switching to a second technology can occur for a specified UI object, while navigating up the UI tree 654.

Further, the UI object technology switching identifier 614 can be configured to use the host technology provider 602 to identify whether a UI object can be switched from a first technology to a second technology when navigating down the UI tree 654. As described above, in one embodiment, the host technology provider 602 knows when switching to a second technology can occur, while navigating down the UI tree. In this embodiment, the UI object technology switching identifier 614 can query the host technology provider 602 to identify if switching can occur.

The exemplary system 600 further comprises a second technology identifier 614, which can be configured to use information stored by the TAL 604 to identify the second technology when navigating up the UI tree 654, and use the technology switching capability request function 608 to identify the second technology when navigating up the UI tree 654. As described above, in one embodiment, the TAL 604 can cache 652 switching information while navigating down the UI tree 654. In this embodiment, this stored information can comprise which technology was switched (e.g., merged into the UI tree). As an example, information stored in a UI container object can include the second technology, which may be used by the second technology identifier 614 to identify the second technology when navigating up the UI tree.

Further, when navigating down the UI tree 654, the second technology identifier 614 can use the technology switching capability request function 608 to identify a technology to switch, as described above. In one embodiment, in response to the request, a registered technology 650 can return a UI object supported by the registered technology 650. In this way, for example, a second technology has been identified.

The exemplary system 600 further comprises a UI object conversion function 616, which can be configured to convert the UI object from the first technology to the second technology in the UI tree 654 using a COM-based conversion for the UI object. In one embodiment, conversion of the UI object from a first technology to a second technology (e.g., merging UI tree) can be COM-based for native object, by default. As an example, hosting a guest technology typically requires that two technologies communicate with each other, which is typically done by COM interfaces. In this embodiment, a COM-based conversion can be used for most situations.

Figure 8:
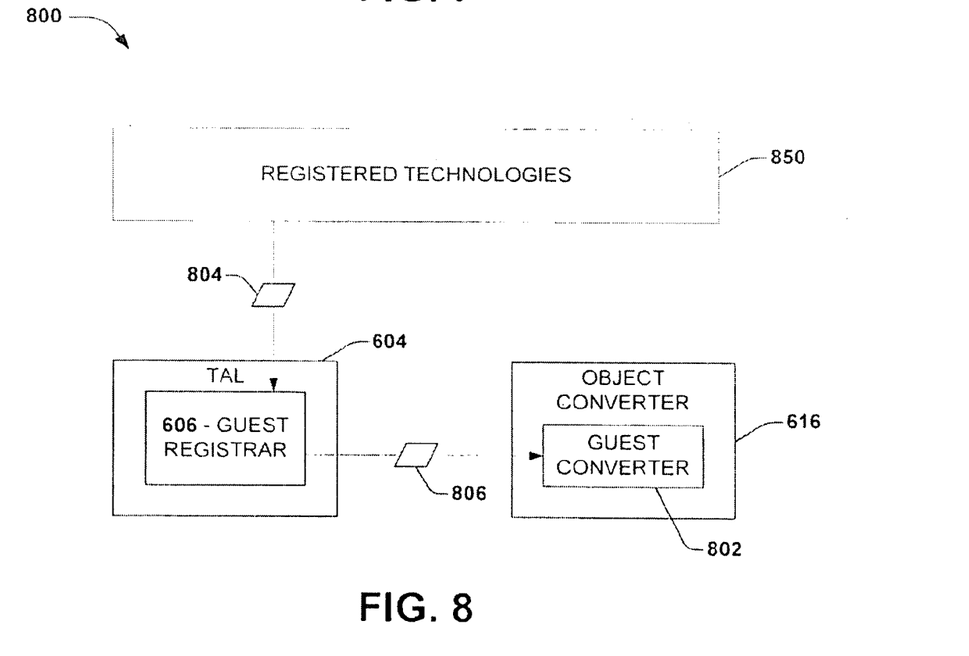
FIG. 8 is a component block diagram illustrating an exemplary system for providing a merged tree view of user interface (UI) objects in a windowless UI.

In another embodiment, as seen in the exemplary embodiment 800 of a UI object conversion function 616, in FIG. 8, the UI object conversion function 616 can comprise a guest technology convert function 802. In this embodiment, the guest technology convert function 802 can be registered with the TAL 604, and configured to return a technology supported UI object for the UI object. For example, there may be situations where a conversion other than a COM-based conversion is preferable. In this example, respective registered technologies 650 can register corresponding "convert" functions that can take a UI object and return a UI object supported by the registered technology 650.

Figure 9:
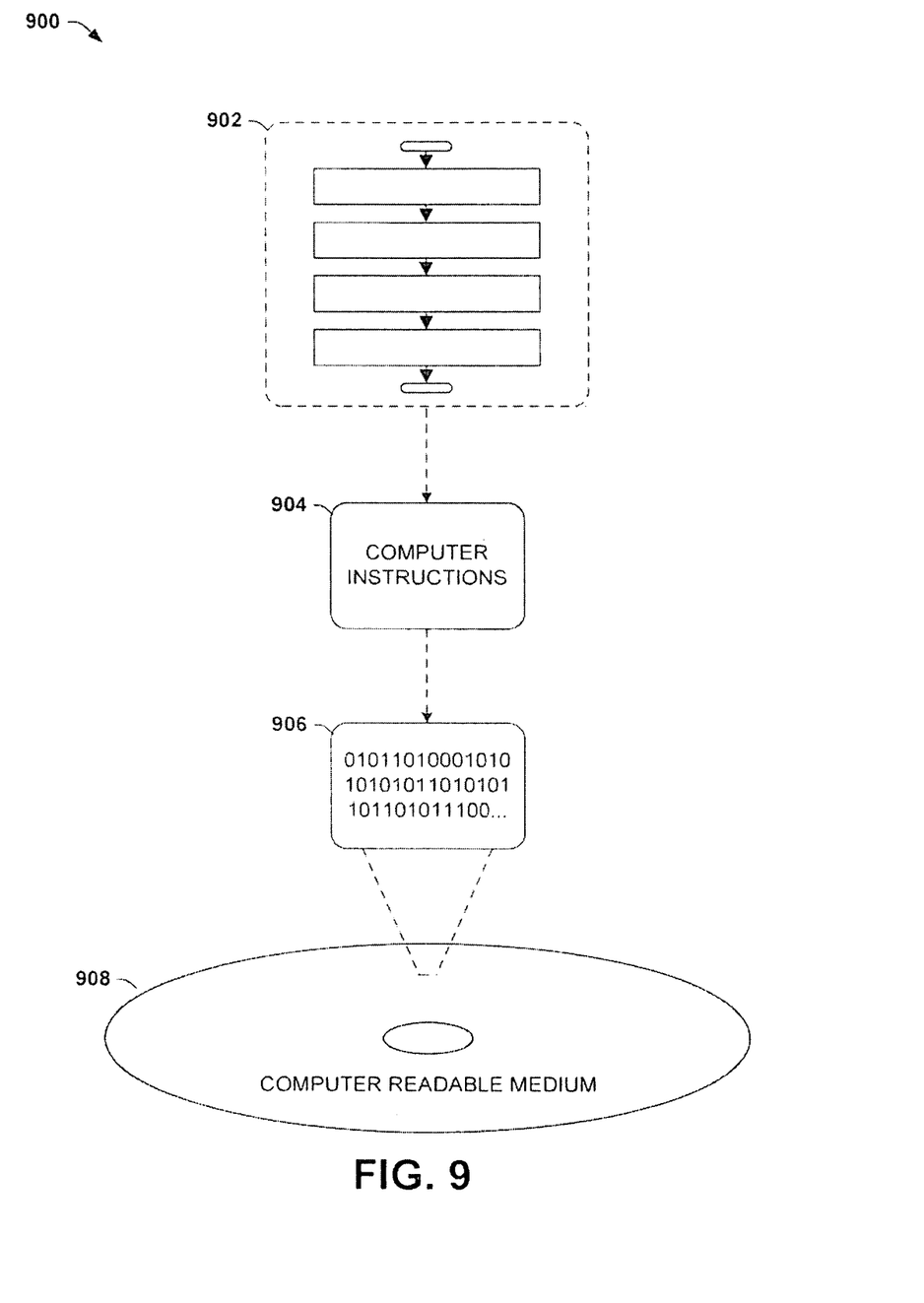
FIG. 9 is an illustration of an exemplary computer-readable medium comprising processor-executable instructions configured to embody one or more of the provisions set forth herein.

Still another embodiment involves a computer-readable medium comprising processor-executable instructions configured to implement one or more of the techniques presented herein. An exemplary computer-readable medium that may be devised in these ways is illustrated in FIG. 9, wherein the implementation 900 comprises a computer-readable medium 908 (e.g., a CD-R, DVD-R, or a platter of a hard disk drive), on which is encoded computer-readable data 906. This computer-readable data 906 in turn comprises a set of computer instructions 904 configured to operate according to one or more of the principles set forth herein. In one such embodiment 900, the processor-executable instructions 904 may be configured to perform a method 902, such as the exemplary method 300 of FIG. 3, for example. In another such embodiment, the processor-executable instructions 904 may be configured to implement a system, such as the exemplary system 600 of FIG. 6, for example. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 10:
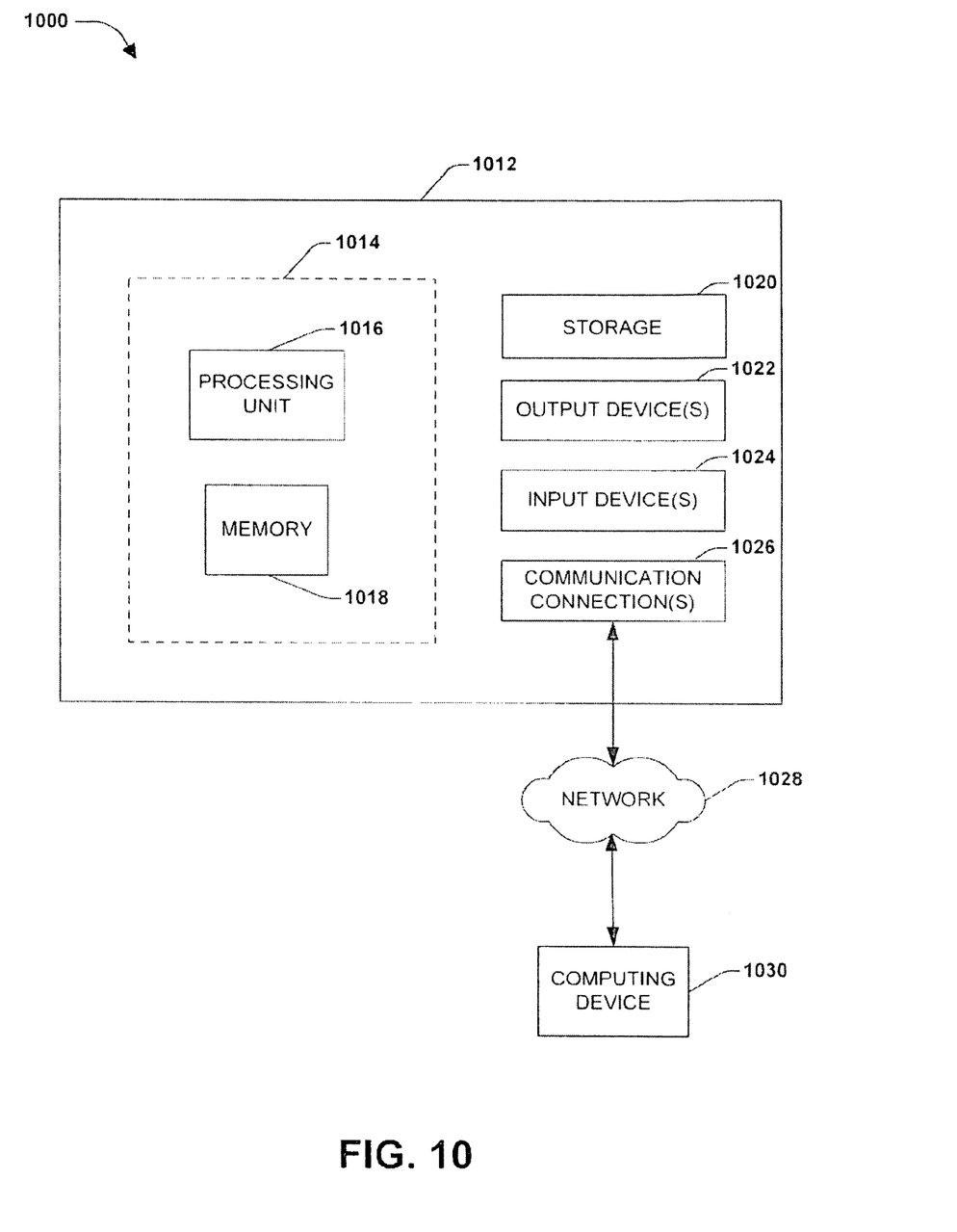
FIG. 10 illustrates an exemplary computing environment wherein one or more of the provisions set forth herein may be implemented.

FIG. 10 and the following discussion provide a brief, general description of a suitable computing environment to implement embodiments of one or more of the provisions set forth herein. The operating environment of FIG. 10 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 10 illustrates an example of a system 1000 comprising a computing device 1012 configured to implement one or more embodiments provided herein. In one configuration, computing device 1012 includes at least one processing unit 1016 and memory 1018. Depending on the exact configuration and type of computing device, memory 1018 may be volatile (such as RAM, for example), non-volatile (such as ROM, flash memory, etc., for example) or some combination of the two. This configuration is illustrated in FIG. 10 by dashed line 1014.

In other embodiments, device 1012 may include additional features and/or functionality. For example, device 1012 may also include additional storage (e.g., removable and/or non-removable) including, but not limited to, magnetic storage, optical storage, and the like. Such additional storage is illustrated in FIG. 10 by storage 1020. In one embodiment, computer readable instructions to implement one or more embodiments provided herein may be in storage 1020. Storage 1020 may also store other computer readable instructions to implement an operating system, an application program, and the like. Computer readable instructions may be loaded in memory 1018 for execution by processing unit 1016, for example.

The term "computer readable media" as used herein includes computer storage media. Computer storage media includes volatile and nonvolatile, removable and non-removable media implemented in any method or technology for storage of information such as computer readable instructions or other data. Memory 1018 and storage 1020 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 1012. Any such computer storage media may be part of device 1012.

Device 1012 may also include communication connection(s) 1026 that allows device 1012 to communicate with other devices. Communication connection(s) 1026 may include, but is not limited to, a modem, a Network Interface Card (NIC), an integrated network interface, a radio frequency transmitter/receiver, an infrared port, a USB connection, or other interfaces for connecting computing device 1012 to other computing devices. Communication connection(s) 1026 may include a wired connection or a wireless connection. Communication connection(s) 1026 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 1012 may include input device(s) 1024 such as keyboard, mouse, pen, voice input device, touch input device, infrared cameras, video input devices, and/or any other input device. Output device(s) 1022 such as one or more displays, speakers, printers, and/or any other output device may also be included in device 1012. Input device(s) 1024 and output device(s) 1022 may be connected to device 1012 via a wired connection, wireless connection, or any combination thereof. In one embodiment, an input device or an output device from another computing device may be used as input device(s) 1024 or output device(s) 1022 for computing device 1012.

Components of computing device 1012 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 1012 may be interconnected by a network. For example, memory 1018 may be comprised of multiple physical memory units located in different physical locations interconnected by a network.

Those skilled in the art will realize that storage devices utilized to store computer readable instructions may be distributed across a network. For example, a computing device 1030 accessible via network 1028 may store computer readable instructions to implement one or more embodiments provided herein. Computing device 1012 may access computing device 1030 and download a part or all of the computer readable instructions for execution. Alternatively, computing device 1012 may download pieces of the computer readable instructions, as needed, or some instructions may be executed at computing device 1012 and some at computing device 1030.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method, implemented at least in part via a processing unit, comprising:
traversing a first UI tree associated with a host technology provider, the traversing comprising:
identifying a first UI object exposed within the first UI tree by the host technology provider;
sending a request to the host technology provider to determine whether the first UI object can be switched from a first technology provided by the host technology provider to a second technology different than the first technology;
responsive to determining that the first UI object can be switched to the second technology, sending a request to a guest technology provider to identify a switching capability provided by the guest technology provider for the first UI object, the guest technology provider different than the host technology provider;
identifying a second guest technology provider that may be capable of switching the first UI object;
obtaining a second switching capability associated with the second guest technology provider;
evaluating the switching capability of the guest technology provider and the second switching capability of the second guest technology provider against a pre-determined priority basis; and
invoking at least one of the guest technology provider or the second guest technology provider to switch the first UI object from the first technology to the second technology for exposure in a merged tree based upon the pre-determined priority basis, the merged tree not comprising the first UI object corresponding to the first technology.

2. The method of claim 1, the switching comprising:
converting the first UI object into a converted UI object associated with the second technology; and
merging the converted UI object into the first UI tree to create the merged tree.

3. The method of claim 2, the switching comprising:
merging a second UI tree comprising the converted UI object into the first UI tree to create the merged tree.

4. The method of claim 1, the traversing comprising:
performing a downward traversal of the first UI tree, comprising:
responsive to switching the first UI object, storing switching information associated with the switching as a container UI object in a cache, the switching information identifying at least one of the guest technology provider or the second guest technology provider as capable of switching the first UI object to the second technology.

5. The method of claim 1, comprising performing an upward traversal of the first UI tree.

6. The method of claim 1, the sending a request to a guest technology provider to identify a switching capability comprising:
exposing the first UI object to the guest technology provider; and
receiving a response from the guest technology provider indicative of whether the guest technology provider is capable of switching the first UI object from the first technology to the second technology.

7. The method of claim 1 the second guest technology provider different than the guest technology.

8. The method of claim 1, comprising:
registering the guest technology provider with a technology adapter layer to create a registration; and
identifying the guest technology provider based upon the registration.

9. The method of claim 1, the switching comprising:
converting the first UI object from the first technology to the second technology using a convert function registered with a technology adapter layer by.

10. The method of claim 9, the converting the first UI object from the first technology to the second technology using a convert function comprising:
inputting the first UI object into the convert function to obtain a supported UI object; and
merging the supported UI object into the first UI tree to create the merged tree.

11. A system comprising:
one or more processing units; and
memory comprising instructions that when executed cause the one or more processing units to implement a technology adapter layer configured to traverse a first UI tree associated with a host technology provider by controlling the system to:
identify a first UI object exposed within the first UI tree by the host technology provider;
send a request to the host technology provider to determine whether the first UI object can be switched from a first technology provided by the host technology provider to a second technology different than the first technology; and
responsive to determining that the first UI object can be switched to the second technology;
send a request to a guest technology provider to identify a switching capability provided by the guest technology provider for the first UI object, the guest technology provider different than the host technology provider;
identify a second guest technology provider that may be capable of switching the first UI object;
obtain a second switching capability associated with the second guest technology provider;
evaluate the switching capability of the guest technology provider and the second switching capability of the second guest technology provider against a pre-determined priority basis; and
invoke at least one of the guest technology provider or a second guest technology provider to switch the first UI object from the first technology to the second technology for exposure in a merged tree based upon the pre-determined priority basis, the merged tree not comprising the first UI object corresponding to the first technology.

12. The system of claim 11, wherein the instructions, when executed, further cause the one or more processing units to control the system to:
convert the first UI object into a converted UI object associated with the second technology; and
merge the converted UI object into the first UI tree to create the merged tree.

13. The system of claim 12, wherein the instructions, when executed, further cause the one or more processing units to control the system to:

merge a second UI tree comprising the converted UI object into the first UI tree to create the merged tree.

14. The system of claim 11, wherein the instructions, when executed, further cause the one or more processing units to control the system to:
  expose the first UI object to the guest technology provider; and
  receive a response from the guest technology provider indicative of whether the guest technology provider is capable of switching the first UI object from the first technology to the second technology.

15. The system of claim 11, wherein the instructions, when executed, further cause the one or more processing units to control the system to:
  perform a downward traversal of the first UI tree, comprising:
  responsive to switching the first UI object, store switching information associated with the switching as a container UI object in a cache, the switching information identifying at least one of the guest technology provider or the second guest technology provider as capable of switching the first UI object to the second technology.

16. The system of claim 11, wherein the instructions, when executed, further cause the one or more processing units to control the system to perform an upward traversal of the first UI tree.

17. The system of claim 11, wherein the instructions, when executed, further cause the one or more processing units to control the system to:
  obtain a second switching capability associated with the second guest technology provider.

18. The system of claim 11, wherein the instructions, when executed, further cause the one or more processing units to control the system to:
  convert the first UI object from the first technology to the second technology using a convert function.

19. The system of claim 18, wherein the instructions, when executed, further cause the one or more processing units to control the system to:
  input the first UI object into the convert function to obtain a supported UI object; and
  merge the supported UI object into the first UI tree, resulting in the merged tree.

20. A computing device comprising:
one or more processing units; and
memory comprising instructions that when executed cause the one or more processing units to:
  traverse a first UI tree associated with a host technology provider, the traversing comprising:
  identifying a first UI object exposed within the first UI tree by a host technology provider;
  sending a request to the host technology provider to determine whether the first UI object can be switched from a first technology provided by the host technology provider to a second technology different than the first technology;
  responsive to determining that the first UI object can be switched to the second technology, sending a request to a guest technology provider to identify a switching capability provided by the guest technology provider for the first UI object, the guest technology provider different than the host technology provider;
  identifying a second guest technology provider that may be capable of switching the first UI object;
  obtaining a second switching capability associated with the second guest technology provider;
  evaluating the switching capability of the guest technology provider and the second switching capability of the second guest technology provider against a pre-determined priority basis; and
  invoking at least one of the guest technology provider or the second guest technology provider to switch the first UI object from the first technology to the second technology for exposure by the guest technology provider in a merged tree based upon the pre-determined priority basis, the merged tree comprising a second UI object corresponding to the first technology and not comprising the first UI object corresponding to the first technology.

* * * * *